United States Patent [19]
St. Clair

[11] 3,880,004
[45] Apr. 29, 1975

[54] COMPENSATED ROTARY GAS METER
[75] Inventor: Theodore A. St. Clair, Fairfield, Conn.
[73] Assignee: Textron Inc., Providence, R.I.
[22] Filed: July 12, 1973
[21] Appl. No.: 378,708

[52] U.S. Cl. .............................. 73/254; 73/194 M
[51] Int. Cl. ............................................. G01f 3/08
[58] Field of Search .... 73/194 M, 231 M, 232, 233, 73/254, 261

[56] References Cited
UNITED STATES PATENTS

| | | | |
|---|---|---|---|
| 1,850,425 | 3/1932 | Taylor | 73/254 X |
| 1,887,400 | 11/1932 | Dayton | 73/254 |
| 2,207,182 | 7/1940 | Smith | 73/254 X |
| 2,258,878 | 10/1941 | Bassler | 73/254 |
| 2,531,620 | 11/1950 | Grise | 73/232 |

Primary Examiner—Richard C. Queisser
Assistant Examiner—John P. Beauchamp
Attorney, Agent, or Firm—Arthur A. Johnson

[57] ABSTRACT

There is disclosed herein a gas meter of the rotary type to be located between the inlet port and the outlet port of a gas system and comprising a primary rotor unit designed to meter the volume of gas flowing between said inlet port and said outlet port, a secondary rotor unit designed to return from said outlet port to said inlet port a quantity of gas substantially equal to the amount of gas which unavoidably leaks past the primary rotor unit, manually adjustable valve means being provided to control the quantity of gas returned to the inlet port by said secondary rotor unit. In one embodiment of the invention temperature responsive control means are provided for controlling the quantity of gas returned to the inlet port by the secondary rotor in each cycle of operations of the latter, and thus compensate for variations in the temperature and hence the density and hence the B.T.U. content of the gas being metered.

7 Claims, 5 Drawing Figures

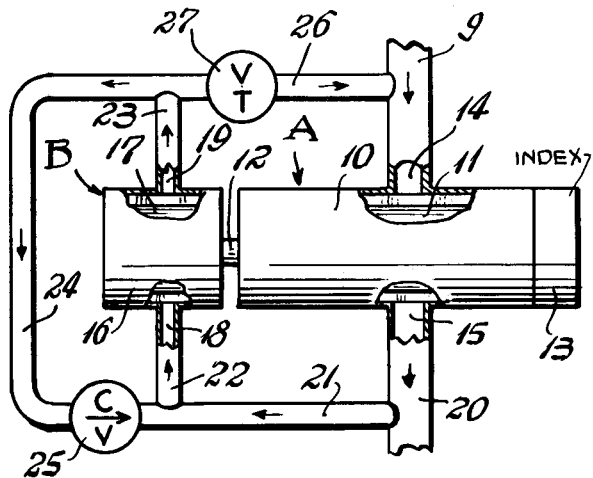
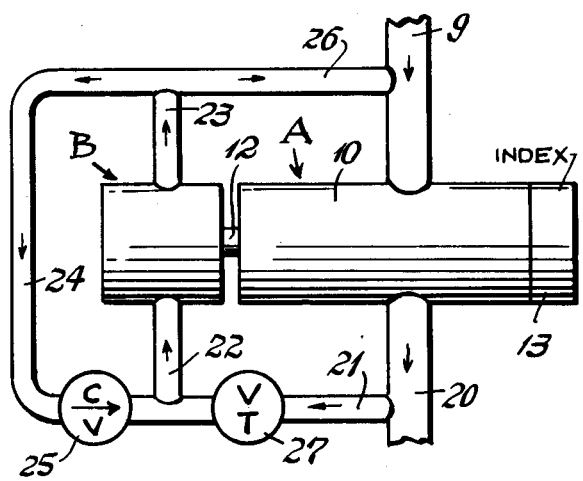
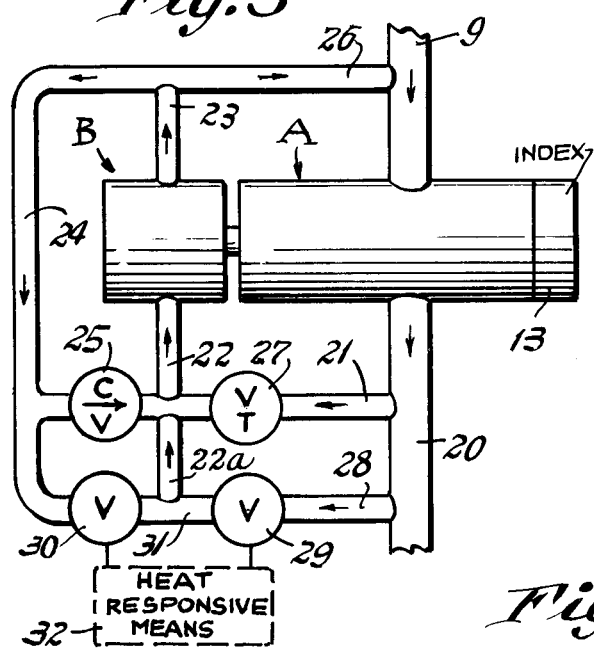
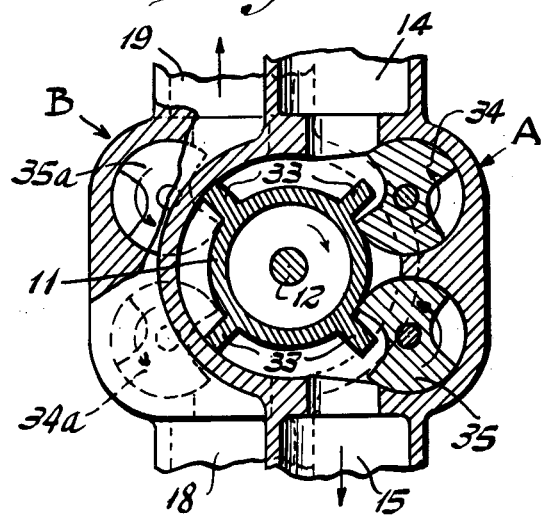
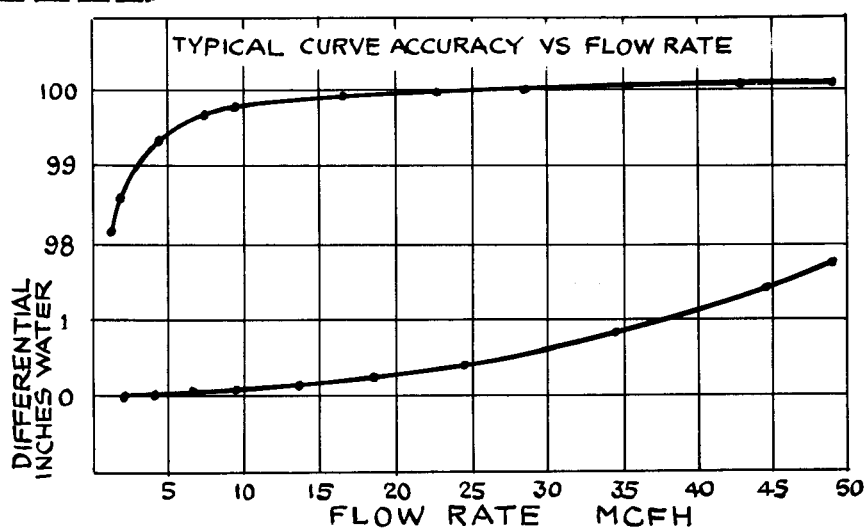

COMPENSATED ROTARY GAS METER

This invention relates to gas meters of the rotary type and more particularly to means for compensating for the unmeasured gas that leaks between the surfaces of the blades of the rotor and those of the stator chamber in which the blades rotate.

It is well known in the art that a weakness of rotary type meters is that extremely small running clearances are required to achieve reasonably accurate measurements of the gas flowing through the meter. While the proportion of such leakage of unmeasured gas is substantially the same at higher flow rates, the proportion of leakage gas to the measured gas is excessively high at low flow rate. For instance, at a flow rate of 20,000 cfh with a leakage of 30 cfh, the leakage rate is 0.15 percent while at a flow rate of 2,500 cfh with leakage of 30 cfh the leakage rate is 1.2 percent which results in the meter having only a 98.8 percent accuracy.

To maintain such accuracy, heretofore the closest practical tolerances had to be observed in the manufacture of the rotor and stator portions of rotary type meters.

Instead of attempting to obtain closer tolerances in the manufacture of a rotary meter at increased cost, the present invention compensates for the leakage by providing for the return of the unmeasured gas to the inlet of the rotary meter where it can be added to the amount of gas passing through the meter.

For this purpose the rotary meter of the present invention is provided with two rotor units, a primary rotor unit through which the stream of gas passes from the inlet port to the outlet port of the meter and by which it is intended to measure the volume of gas consumed, and a secondary rotor unit for returning an amount of gas from the outlet port of the primary rotor unit to the inlet port thereof, so that at each cycle of operations of the primary rotor the leakage gas can be subtracted from the displacement of the primary rotor so that it does not become measured gas.

The secondary rotor may be, and preferably is driven by the primary rotor and preferably is mounted on the same shaft as the primary rotor from which the index operating mechanism of the meter is driven.

So that the secondary rotor may operate as an impeller to return the leakage gas to the primary rotor, a spring loaded check valve, or the equivalent, is inserted in the conduit means between the inlet port of the secondary rotor and the outlet port thereof, to increase the outlet pressure of the secondary rotor sufficiently to overcome the line pressure of the gas at the inlet port of the primary rotor.

To control the volume of gas being returned to the inlet port there is provided by the present invention at an appropriate place in the conduit means connecting the primary and secondary rotors, a manually operable control or throttle valve which may be located between the outlet of the secondary rotor and the inlet of the primary rotor, or between the outlet of the primary rotor and the inlet of the secondary rotor, since in either position it will limit the volume of gas passing between the rotors to the inlet of the primary rotor.

The throttle valve may, in the broader aspects of this invention, have a fixed orifice if the range of tolerances of the rotor and stator parts is strictly adhered to. However, it is advantageous to have the throttle valve so arranged as to be manually adjustable to compensate for leakage at the factory or elsewhere when each meter is being individually proved.

The relative displacement of the primary and secondary rotors may vary widely so long as the secondary rotor is capable of pumping at least the maximum volume of gas which could possibly escape past the blades of the primary rotor, since excess pumping capacity merely recirculates through a return conduit between the outlet and inlet of the secondary rotor.

In addition to compensating for the gas leakage variations due to variation in the clearance tolerance, the present invention provides temperature responsive means to compensate for differences in the temperature and hence the density, i.e., the B.T.U. content of the gas being measured. In this connection attention is called to my copending application, Ser. No. 229,943, filed Feb. 28, 1972, now U.S. Pat. No. 3,782,196, in which the primary rotor unit is designed to measure the volume of gas at a determinate minimum absolute temperature and the secondary rotor unit has the capacity to flow to the outlet means a quantity of gas equal to the difference in said predetermined volume of the gas at a minimum and maximum absolute temperature. Attention is also called to my copending application Ser. No. 378,780, filed July 12, 1973, Pat. No. 3,859,855, in which the primary rotor unit is designed to measure the quantity of gas flowing at maximum absolute temperature and the secondary rotor unit subtracts from the output of the primary rotor unit and adds to the input of the primary rotor unit a quantity of gas equal to the difference in volume of the gas at maximum and minimum absolute temperatures.

Other features and advantages will hereinafter appear.

Referring to the drawings:

FIG. 1 is a schematic view showing one form of this invention in which the control valve is located between the outlet of the secondary rotor and the inlet of the primary rotor.

FIG. 2 is a similar view showing the control valve located between the outlet of the primary rotor and the inlet of the secondary rotor.

FIG. 3 is like FIG. 2 but includes temperature responsive means for compensating for variations in the temperature (hence density) of the gas being metered.

FIG. 4 shows a typical curve indicating the drop in percentage of the gas measured at various flow rates.

FIG. 5 is a vertical sectional view through the primary rotor unit showing the valves thereof in full lines and the valves for the secondary rotor unit in dotted lines.

As shown in FIG. 1, the rotary gas meter of the present invention comprises a primary rotor unit A having a stator 10 and a rotor 11 which is carried by a shaft 12 which operates an index mechanism 13 which counts the revolutions of the shaft 12 and indicates the volume of the gas passing through the meter from an inlet 14 to an outlet 15.

The degree of accuracy of a rotary type meter depends in part on the closeness of the fit between the stator and the rotor. Some tolerances in the dimensions of the stator and rotor are necessary to permit the free rotation of the rotor 11 under the force of the gas passing through the meter. To maintain close clearances between the relatively moving parts substantially increases the cost of manufacturing the meter, but even with reasonably close tolerances there is the unavoidable leakage, the amount of which depends somewhat on the characteristics of each individual meter.

As indicated by the curves shown in FIG. 4, the accuracy of a rotary type gas meter is substantially constant at the normal and higher flow rates, but falls off rapidly as the flow rate drops off to 10 MCFH due largely to the leakage of gas between the stator and rotor of the meter.

The present invention has solved the problem of leakage due to clearances by determining for each particular meter the percentage of such leakage which exists to the volume of gas flowing and providing for the return of the leakage gas to the inlet side of the rotor unit A to be measured.

For this purpose the present invention provides a secondary rotor unit B having a stator 16 and a rotor 17, an inlet port 18 and an outlet port 19. For convenience in illustration the rotor 17 is arranged to cause the gas to flow in the direction opposite to that of rotor 11 of the unit A.

As shown in FIG. 1, the outlet port 15 of the primary rotor A has an outlet conduit 20 connected by conduits 21 and 22 to the inlet port 18 of the secondary rotor unit B. Driven by the shaft 12, the rotor 17 of the rotor unit B causes the gas to flow through conduits 23 and 24 toward the conduit 22. However, before the gas reaches the conduit 22 it must pass through a spring-operated check valve 25 which has the effect of increasing the pressure of the gas at the outlet of the conduit 23 and overcome the force of the gas coming in through the inlet pipe 9.

Unimpeded the gas from the rotor unit B having a higher pressure than that flowing in the inlet pipe 9 would flow into conduit 26 which is connected to the inlet pipe 9 and from the latter to the inlet 14 of the rotor unit A. However, to control the flow of gas so as to limit it to an amount substantially equal to the volume of the leakage gas, there is provided a valve 27.

In the more specific aspects of this invention, the valve 27 is manually adjustable and the adjustment is made when proving the meter, the orifice of the valve being made larger or smaller until the volume of gas flowing into the inlet pipe 9 consists of a determinate volume substantially equal to the amount of the leakage gas.

Stated in other words, the secondary rotor unit B is designed to subtract from the output of the rotor unit A the unmeasured portion of the flowing gas and combine or return it with the gas flowing into the rotor unit A to be measured thereby.

With the use of the present invention, since the unavoidable leakage is compensated for by the return of the unmeasured gas in the inlet, extremely close tolerances are not required, thereby facilitating the manufacture of the meter.

As shown in FIGS. 2 and 3, the back check valve 25 is located in the conduit 24 but the manually adjustable valve 27 may be located in the conduit 21 between the outlet conduit 20 of the rotor unit A and the conduit 22 of the inlet to the rotor unit B, thus controlling the gas flowing from the outlet conduit 20 of the rotor unit A to the inlet conduit 22 of the rotor unit B.

In my copending application, Ser. No. 229,943, filed Feb. 28, 1972, now U.S. Pat. No. 3,782,156, there is disclosed and claimed means for compensating in a rotary type meter for variations in temperature of the gas being measured in which the primary rotor unit has a capacity to meter a predetermined volume of gas at a determinate minimum absolute temperature and a secondary rotor unit is responsive to the temperature of the gas and has a capacity to flow a quantity of gas which is equal to the difference in said predetermined volume of gas at a minimum absolute temperature for controlling the output of the secondary rotor. However, in the embodiment of the present invention shown in FIG. 3 in which means are provided for also compensating for variations in the temperature and hence the density and B.T.U. content of the gas being measured, it is more convenient to design the primary rotor unit A to pass a determinate volume of gas at a determinate maximum absolute temperature for each revolution of the rotor 11 and to withdraw from the output of the rotor unit A a quantity of gas which is equal to the difference in said predetermined volume at said maximum absolute temperature and the volume of gas at said minimum absolute temperature since in compensating for leakage, as pointed out above, the leakage gas is withdrawn from the outlet conduit 20.

Thus, as shown in FIG. 3 the outlet conduit 20 has a branch 28 connected to a valve 29 which is also connected to a branch 22a of the inlet pipe 22 of the rotor unit B and the valve 30 is connected to the conduit 24 which leads to the inlet of the rotor unit B and to the conduit 31 leading to the branch 22a.

The valves 29 and 30 are thermostatically controlled by heat responsive means 32 to subtract from the outlet and feed into the inlet of the secondary rotor unit B an amount of gas necessary to compensate for changes in temperature of the gas. Assuming that the absolute temperature of the gas is at the maximum, the valve 29 will be open and the valve 30 would be closed to the degree that an amount of gas equivalent to the difference in volume or density between the volume of a unit of gas at maximum temperature and at minimum temperature will flow through the conduits 31, 22a and 22 to the inlet of the secondary rotor unit B.

It has been stated above that the rotor gas flow of the gas in 11 of the primary rotor unit A and gas flow in the rotor 17 of the secondary rotor unit B are in opposite directions. This may be accomplished in various ways but preferably as shown in FIG. 5 the fins 33 on one side of the rotor 17 are engaged by rotary valves 34 and 35 causing the gas to travel to the outlet 15 while the fins in the secondary rotor unit B engage rotary valves 34a and 35a causing the gas to flow toward the outlet 19. Stated differently, the fins 33 on the right side of the rotor 11 move downwardly as viewed in FIG. 5 and carry the fluid from inlet 14 to outlet 15, while the fins on the left side of the rotor 17 move upwardly and carry the fluid from the inlet 18 to the outlet 19.

Variations and modifications may be made within the scope of the claims and portions of the improvements may be used without others.

I claim:

1. A rotary gas meter having a rotor unit having inlet means and outlet means, said rotor unit having a rotor and a stator and having a capacity to measure in each cycle of rotations a predetermined volume of gas including a predetermined volume of leakage gas resulting from clearance between said rotor and said stator of said rotor unit, and means for returning from said outlet means to said inlet means of said rotor unit during each cycle of operations thereof a volume of gas substantially equal to said predetermined volume of leakage gas and in which said rotor unit is a primary rotor unit, and said means for returning said predetermined volume of leakage gas comprises a secondary rotor unit driven by said primary rotor unit, said secondary rotor unit having a capacity to return from said outlet means to said inlet means of said primary rotor unit at each cycle of the secondary rotor unit a volume of gas substantially equal to said predetermined volume of said leakage gas.

2. A rotary gas meter according to claim 1 in which said means for returning the predetermined volume of leakage gas to the inlet means includes a manually adjustable valve which may be adjusted during proving of the meter.

3. A rotary gas meter according to claim 1 in which there is adjustable valve means between said secondary rotor unit and said inlet of said primary rotor unit for regulating the quantity of leakage gas so returned to substantially said predetermined volume of leakage gas passing through that particular primary rotor unit.

4. A rotary gas meter according to claim 2 in which said secondary rotor unit has inlet means and outlet means and there are recirculating conduit means between said inlet means and outlet means of said secondary rotor unit through which a volume of gas in excess of the predetermined volume required to compensate for the leakage gas is recirculated through said secondary rotor unit.

5. A rotary gas meter according to claim 4 in which a spring loaded check valve is provided in said recirculating conduit means for maintaining at the outlet of said secondary rotor unit sufficient pressure to overcome the pressure of the gas flowing through the inlet means of said primary rotor unit.

6. A rotary gas meter according to claim 1 in which there are additional means between the inlet means and the outlet means of the primary rotor unit, including temperature responsive means for varying the quantity of gas flowing from the outlet means of the primary rotor unit to the inlet means of the primary rotor unit to compensate for the volumetric changes of the flowing gas due to changes in the absolute temperature of the gas flowing through the meter.

7. A rotary gas meter comprising inlet means, outlet means, a primary rotor unit having a capacity to meter a predetermined volume of gas flowing through the meter from the inlet means to the outlet means, at a determinate maximum absolute temperature, a secondary rotor unit, means connecting said primary rotor unit to said secondary rotor unit for synchronous rotation, conduit means connecting said secondary rotor unit to said inlet means and said outlet means, said secondary rotor unit having the capacity to flow a quantity of gas which is equal to the difference in said predetermined volume of the gas at said maximum absolute temperature and the volume of the same gas at said minimum absolute temperature, temperature responsive means responsive to the absolute temperature of the gas flowing through the meter including valve means for controlling the output of said secondary rotor unit as a function of the difference in absolute temperature between said predetermined maximum absolute temperature and the then existing absolute temperature of the gas flowing through the meter; indexing means connected to and responsive to the operation of said rotor units; and variable means including said secondary rotor unit for subtracting from the outlet means of said primary rotor unit a quantity of gas substantially equal to the unmeasured leakage gas and returning it to the inlet means of said primary rotor unit.

* * * * *